Nov. 2, 1965  D. R. HERRIOTT  3,216,004
OPTICAL ENCODER WITH COMPLEMENT CODE STORAGE
Filed Nov. 7, 1961  2 Sheets-Sheet 1
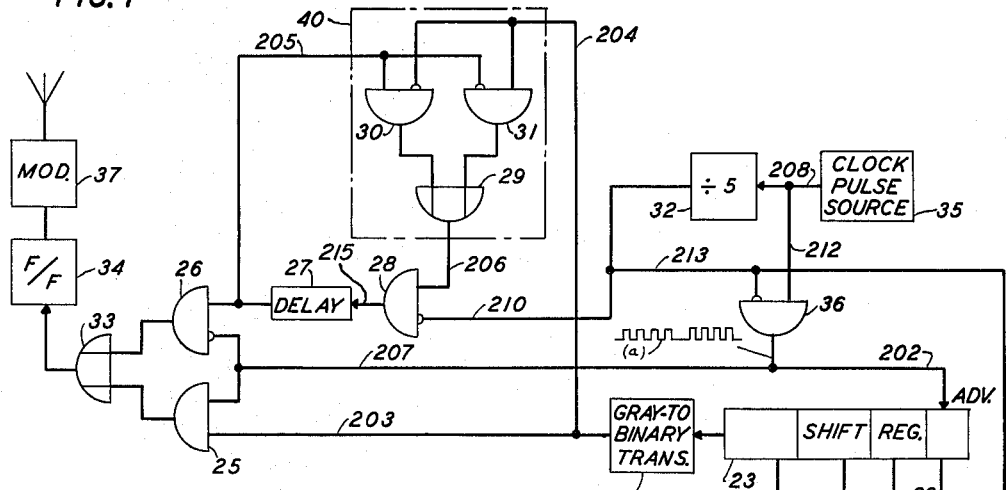
FIG. I
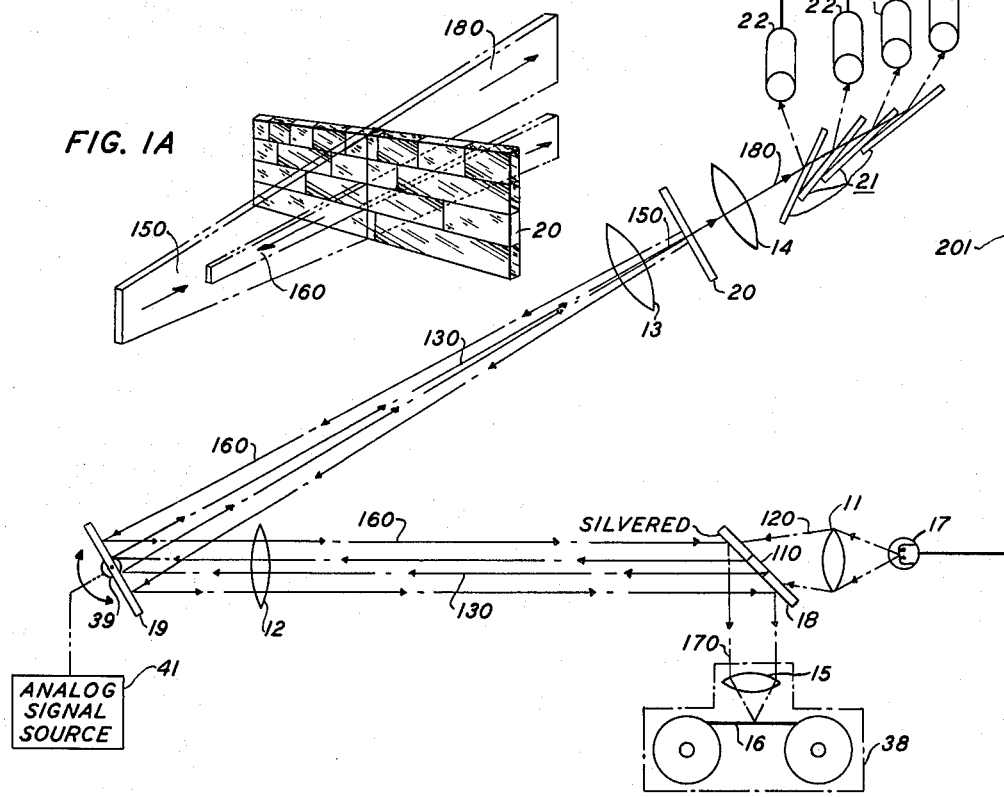
FIG. IA
INVENTOR.
D. R. HERRIOT
BY
ATTORNEY Nov. 2, 1965     D. R. HERRIOTT     3,216,004
OPTICAL ENCODER WITH COMPLEMENT CODE STORAGE
Filed Nov. 7, 1961     2 Sheets-Sheet 2

INVENTOR.
D. R. HERRIOT

BY

ATTORNEY

United States Patent Office 3,216,004
Patented Nov. 2, 1965

3,216,004
OPTICAL ENCODER WITH COMPLEMENT CODE STORAGE
Donald R. Herriott, Morris Township, Morris County, N.J., assignor to Bell Telephone Laboratories, Incorporated, New York, N.Y., a corporation of New York
Filed Nov. 7, 1961, Ser. No. 150,702
3 Claims. (Cl. 340—347)

This invention relates to digital telemetering systems, and more particularly, to optical encoding and recording devices for use in such systems.

The essential characteristics of the typical optical encoding system are the combination of a light source, an appropriate optical system, a means to vary the resulting light beam and a recording device to register the action of the light beam. The predominant embodiment of such an optical encoder is the galvanometer recorder in which the small rotation of a galvanometer mirror causes a light spot to travel a large distance. The optical system is used to amplify electrical signals sensed by the galvanometer. Such an encoder is disclosed in Patent 2,883,649 issued to W. H. King on April 21, 1959, who shows an optical indicating system to determine the maximum value of electrical transients. In the King device, a deflecting mirror galvanometer deflects a light beam onto an alternatively striped opaque and transparent or opaque and reflective mask. The number of light pulses transmitted or reflected by the mask are recorded by a photocell and represent the electrical transient.

A variation of the embodiment in which the deflection of a light beam by a galvanometer mirror can be photographically recorded is disclosed in Patent 1,785,610 issued to E. Belin on December 16, 1930, in which a mirror galvanometer deffects light rays onto a coded mask and the code is transferred to a receiving surface, which could be photographic film, by an optical system.

An optical encoding system is disclosed in "An Optical Encoder and Digit Register" November 1952 Proceedings of the IRE, pages 1573–1583 by H. G. Follingstad, J. M. Shive and R. E. Yeager who show a means to encode the position of a shaft by sensing with photocells the light pattern transmitted by a movable code mask. The photocells in turn apply electrical pulse signals to a shift register. The above stated devices all serve to optically encode a light signal and either record it as an electric signal or make a coded photographic record of the encoded light beam.

It can be seen that if such an optical encoding device were located in a remote scientific station to transmit encoded data it would be advantageous to make a permanent photographic record of the encoded data that is transmitted as a check on the validity of the received data.

The primary object of the present invention is to provide an optical encoding device which will simultaneously encode data for transmission purposes and make a permanent record of the transmitted data.

Another object of the invention is to make the photographic record of transmitted data with a minimum of ancillary equipment.

Another object of the invention is to utilize the optical apparatus so that a portion of the optical path used to encode data to be transmitted is also used to make a permanent record of the transmitted data.

In accordance with the present invention, a mirror affixed to the rotatable shaft of an indicating instrument, such as a deflecting galvanometer, is illuminated by a light source, the angular position of the shaft being the analog representation of the data received by the indicating instrument. The rotatable mirror reflects the light projected on it by the light source onto a code mask whose function is to form the digital equivalent of the analog quantity expressed by the rotatable shaft. The code mask has a coded pattern of transparent areas and reflective areas. The transparent areas of the code mask allow a light pattern to pass through the code mask and to activate a light detector, such as a photomultiplier tube, which convert the light pattern into an electrical signal. The reflective areas of the code mask reflect the complement of the transmitted light pattern. The reflected light pattern is returned by the same optical system used to illuminate the code mask and utilized to excite a light recording device such as a photographic recorder.

In accordance with the invention, a permanent record is made of the code as it is encoded by the code mask, converted to electrical signals and transmitted to a remote receiving station. This eliminates the possibility that errors produced by the transmitting apparatus will be permanently recorded. This is accomplished by the use of a code mask whose opaque areas are mirrored to reflect the complement of the code it transmits.

Other objects and features and attendant advantages of this invention will be more readily understood as these will become apparent by reference to the following detailed description when considered in connection with the accompanying drawing wherein:

FIGS. 1 and 1A are schematic diagrams of the optical encoding and recording apparatus in accordance with the present invention;

Figure 2:
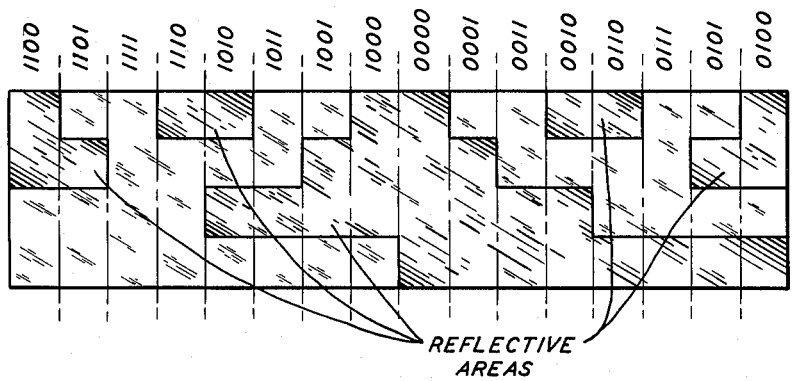
FIG. 2 is a plan view of a linear Gray code mask element suitable for use in the optical encoder of FIG. 1.

The following definitions are given to facilitate understanding of the detailed description of the drawings:

AND-gate—a circuit component that will deliver an output only if all its input terminals are simultaneously energized.

OR-gate—a circuit component that will deliver an output if any one or more than one of its input terminals are energized.

INHIBIT-gate—a gate having an input which, if energized, disables the gate to prevent the delivery of an output.

Exclusive-OR-gate—a gate having two inputs whose output is energized whenever one but not both of its inputs are energized.

Pulse divider—a device in which the output pulse repetition rate is some integral submultiple of the input pulse repetition rate.

Referring more particularly to FIG. 1, there is shown an illustrative embodiment of the invention. The encoding system shown operates as follows. At the completion of the transmission of a code group, a pulse is derived from the pulse divider 32 and applied through lead 201 to energize lamp 17. The image of the flashing lamp 17, represented by light beam 120, is projected by lens 11 onto the rotating mirror 19, which could be a deflecting galvanometer mirror illustrated schematically as an analog signal source 41. Only a narrow band of the light beam 120 projected by lens 11 is allowed to reach the rotating mirror 19, affixed to a rotating axis 39. A slit 110 in mirror 18 allows this narrow light beam 130 to reach the rotatable mirror 19. The slit 110 is exaggerated in size in FIG. 1 for clarity and actually may be of the order of 0.003 inch in width, although it is not limited to this particular dimension.

The light beam 130, transmitted by the slit 110, is projected by lens 12 onto the code mask 20 through the collimating lens 13. The collimating lens 13 causes the light beam 150 to fall perpendicularly on the surface of the code mask 20. The code mask, which is shown in detail on an elevation view in FIG. 2, transmits a coded light pattern, represented by the light beam 180, corresponding to the pattern of the transmitting area of the code mask illuminated by the image of the slit 110.

In FIG. 2 there is shown a linear code mask suitable for use in FIG. 1 in which the cross-hatched areas represent the reflective areas of the code mask and the clear areas represent the transparent portion of the code mask. The pattern on the code mask 20 is arranged to produce transmission patterns in each vertical subdivision corresponding to the elements of a Gray code.

The Gray code is particularly advantageous in a system such as this where an analog-to-digital conversion is made by an optical system. The Gray code has the property that only one digit between any two successive numbers changes at a time. Hence, if the image of the slit, represented by light beam 150, should fall on the dividing line between two successive numbers, only one digit would be ambiguous and hence the maximum error occurring in this position is only a single quantum level.

It is to be understood that the invention is not limited to the use of a plane code mask 20 in conjunction with a collimating lens 13. An alternative embodiment also within the spirit of the invention could comprise a spherical transmitting and reflecting code mask whose geometrical center coincides with the axis of the rotatable shaft 39.

In accordance with the present invention, and as shown in greater detail in FIG. 1A, the reflective portion of the code mask 20 reflects the complement of the code transmitted. The reflected light pattern 160 is returned through the collimating lens 13 to the rotatable mirror 19. The collimating lens 13 serves to project the returning image of the pattern generated by slit 110, through the lens 12 onto the mirror 18. The mirror 18 reflects the returning complementary pattern represented by light beam 160, so that the reflected image of the slit, represented by light beam 170, is directed into the path of a light recording device 38.

An illustrative example of a light recording device 38 is a photographic recorder comprising a photographic film 16 and a lens 15 to project the returning complementary pattern on the film 16. In actual practice it would be desirable to use a plurality of vertically displaced lens 15, thereby having an individual lens for each area of the returning light pattern. It is to be understood that different equivalent recording means could be used to register the returning light pattern without departing from the spirit or scope of the invention.

If the returning complementary pattern, represented by light ray 160, obeyed the ideal laws of geometrical optics, it would be coincident with the slit 110 when it arrived at the mirror 18 and no image would arrive at the light recording device 48. In actual practice, the returning complementary pattern tends to diffuse due to diffraction effects in the optical system. Hence when the returning complementary pattern represented by light ray 160, reaches the slit 110 in the mirror 18, it is wider than this slit and therefore overlaps to some extent. It is the overlapping portion of the returning complementary pattern, represented by light beam 170, that is received by the light recording device 38.

In summary, the lamp 17 illuminates the rotatable mirror 19 which reflects the light beam 130 onto the code mask 20. The code mask transmits a light pattern to a light detection device and reflects the complement of the transmitted pattern. The complementary pattern is returned via the same rotatable mirror to a light recording device for the purpose of making a permanent record of the transmitted data.

The light pattern transmitted by the code mask 20, represented by light beam 180, is projected onto photomultiplier tubes 22 via mirrors 21, one for each photomultiplier 22, by a lens 14. The mirrors 21, which are vertically displaced to provide one mirror for each digit of the code mask, are positioned so as to allow the photosensitive surface of each photomultiplier tube to be located at the principal focus of lens 12 without having to crowd them into a small space. It is to be understood that the light sensitive devices which receive the transmitted light pattern are not limited to photomultiplier tubes. A substituation keeping within the spirit of the invention would be to use photocells each in series with a regenerative type amplifier to detect the transmitted light pattern.

Each photomultiplier 22 when activated by the light beam 180, produces an output current pulse which is interpreted as a binary "1." The photomultipliers 22 which receive no light do not produce an output pulse. This absence of an output is interpreted as a binary "0."

The parallel output of the photomultipliers 22 is fed into a shift register 23. Shift register 23 delivers a serial sequential output by shifting each digit to the left with each advance pulse applied by lead 202. The advance pulses are supplied by clock 35 and applied to gate 36 by lead 212. When shift register 23 is completely empty the pulse delivered by lead 201 to energize lamp 17 allows a new code group to be fed into the shift register 23. The code group leaving shift register 23 in a Gray code form is converted into the conventional binary code by a Gray-to-binary translator 24.

The binary code leaving translator 24 is applied via lead 203 to an AND-gate 25 and via lead 204 to an exclusive OR-gate 40. Exclusive OR-gate 40 consists of two inhibit gates 30 and 31 and an OR-gate 29. The output of translator 24 is also applied along lead 203 to AND-gate 25 which is enabled by the output pulses from INHIBIT gate 36 applied to the other input of AND-gate 25 by the way of lead 207. Clock pulses are supplied via lead 212 to INHIBIT gate 36. The output of the clock pulse source 35 is applied by lead 208 to a pulse divider 32, which in the present embodiment of the invention produces one output pulse for every five input pulses applied to it by the clock 35. It is to be understood, however, that the invention is not intended to be limited to this particular ratio which is used only for illustrative purposes. The output pulses of pulse divider 32 is applied by lead 213 to the inhibit input of gate 36. The output of gate 36 therefore comprises groups of four pulses separated by a pulse interval as shown by the accompanying waveform (a). This output is applied not only to enable gate 25 and advance code groups out of shift register 23 but also to INHIBIT gate 26. The output of gate 36 therefore serves to enable AND-gate 25 with every output pulse it produces and at the same time to disable INHIBIT gate 26.

As can be seen from the illustrative waveform (a), the input of gate 36 applies four successive pulses to the AND-gate 25 to enable it. The four-bit code group applied by shift register 23 via translator 24 to AND-gate 25 is enabled to be transmitted by AND-gate 25 by the pulses applied to gate 25 by gate 36. During the pulse time interval when no pulse is applied by gate 36 to gate 25, gate 25 is disabled. It is during this period of disablement that a new code group is stored in the shift register.

The output of the Gray-to-binary translator 24 is applied via lead 204 to the before-mentioned exclusive OR-gate 40. The other input lead 205 of the exclusive OR-gate 40 is connected to a one-bit delay unit 27, which in turn, is connected to the output of input gate 28 by lead 215.

The purposes of these elements is to generate a parity checkbit. The parity check is a means of determining if a single error has occurred in the transmission of a binary code. The parity checkbit is a digit added to the end of each code word, chosen so that the total number of "1's" (or "0's") in each code group transmitted is always even or always odd. The embodiment described uses an even parity check. That is, the total number of "1's" in every transmitted code group is an even number. Any code group received that has an odd number of "1's" indicates that one of the digits in the code group is in error.

The exclusive OR-gate 40 functions in such a manner such that if both of leads 204 and 205 supply a pulse to gate 40, or if both of leads 204 and 205 do not supply a pulse thereto, no output pulse will appear at the lead 206. If a pulse, however, is applied to either one of the leads 204 or 205 while no pulse is applied to the other lead, an output pulse will appear at lead 206. This result occurs because the enabling input pulse applied to either of the gates 30 or 31 is also applied to the inhibiting input of the other gate.

The parity checkbit is generated by applying the output of the one-bit delay unit 27, and the output of the Gray-to-binary translator 24, through the leads 205 and 204, respectively to exclusive OR-gate 40 and applying the output of exclusive OR-gate 40 to the one-bit delay unit 27. At the start of the transmission of each new code group no pulse is stored in delay unit 27. That is, delay unit 27 is cleared by virtue of inhibiting gate 28 which disabled any pulse output of gate 40 which would be applied to the delay unit 27 by means of a pulse applied through lead 210 to its inhibiting input.

The one-bit delay unit 27 stores the output pulses of the exclusive OR-gate 40. Each pulse output from pulse divider 32 is applied to the inhibiting input of gate 36 by lead 213 and disables one pulse in each five arriving from clock 35, as shown by the illustrative waveform (a) demonstrating the output of INHIBIT gate 36. Every output pulse of gate 36 serves to enable AND-gate 25 and disable gate 26. The gate 26 applies the pulse stored in the one-bit delay unit 27 after four successive code digits are transmitted by gate 25 to the OR-gate 33 for transmission purposes. A pulse stored in the one-bit delay unit 27 may be interpreted as a binary "1," while the lack of such a pulse may be interpreted as a binary "0." The digit that is passed by gate 26 is known as the parity check digit.

As can be seen from the foregoing, the previous output of the exclusive OR-gate 40, which is delayed one pulse time interval by the delay unit 27, is applied simultaneously with each new output of the translator 24 to the input of gate 40. The first pulse applied by translator 24 to gate 40 is always stored in the delay unit 27, since at the beginning of the transmission of a new code group the delay unit 27 has no pulse stored. Any successive pulse time interval when no pulse is applied to the gate 40, will find a pulse maintained in the delay unit 27. A second pulse applied from translator 24 to the gate 40 thereafter will disable gate 40 and no pulse will be stored in delay unit 27. A third pulse applied by translator 24 to the gate 40 will again store a pulse in delay unit 27.

If the translator 24 in the transmission of a code applied an even number of pulses to gate 40 no pulse will be stored in the delay unit 27 at the completion of the transmission of the code group. If, however, translator 24 applies an odd number of pulses to gate 40 a pulse will be stored in delay unit 27 at the completion of the transmission of the code group. It is the condition of the delay unit 27 at the completion of a code group transmission that determines the parity check digit. The condition of delay unit 27 is such that the number of pulses in the code group transmitted and the addition of the pulse or a lack of a pulse stored in the delay unit 27 at the end of a code group transmission always adds up to an even number of pulses. Any pulse stored in the delay unit 27 present at the end of a code group transmission is gated by INHIBIT gate 26 and is added to the end of the previously transmitted code group as a parity checkbit.

The binary code group plus its parity check digit is fed through the OR-gate 33 to the flip-flop 34. The output of the flip-flop 34 is then delivered to a modulator 37 for transmission purposes.

The electronic circuit components of the encoder of FIG. 1 are all well known in the art and can be realized in many alternate specific embodiments. A typical shift register 23, which would be suitable for an application such as this, is disclosed in "Integrated Magnetic Circuits for Logic Machines" by U. F. Gianola in the March 1960 Bell System Technical Journal, pages 295–332. This same article also discloses magnetic core switching embodiments of exclusive OR-gate; AND-gates and OR-gates. Alternate embodiments of AND-gate and OR-gate utilizing transistor or vacuum tubes instead of switching cores are disclosed in "Digital Computer Components and Circuits" by R. K. Richards, D. Van Nostrand Company. The same book also suggests how cryotrons may be used to perform logic functions which represent still another embodiment of the particular circuit. A typical embodiment of a Gray-to-binary translator is disclosed in "An Optical Encoder and Digit Register" by H. L. Follingstad, J. M. Shive and R. E. Yeager in the November 1952, Proceeding of the IRE, pages 1573–1583. The authors disclose a device in which the translator and shift register are combined in a single structure although the translator could comprise a separate component as disclosed in the present invention.

The pulse divider 32 may comprise any frequency dividing multivibrator. Such circuits are described in chapters 13 and 14 of "Electron Tube Circuits" by S. Seeley, McGraw-Hill. The same reference source discloses typical embodiments of flip-flops suitable for use as flip-flop 34. The specific embodiment of a circuit component to function as a flip-flop can be realized using many circuit elements, including vacuum tubes, transistors and magnetic cores. It is to be understood that the actual circuit components utilized in the above encoder can take many varied forms without departing from the spirit and scope of the invention.

Figure 3:
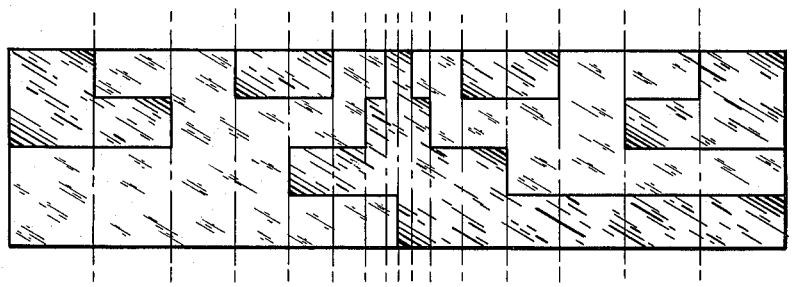
FIG. 3 is a plan view of an alternate nonlinear form of the Gray code mask element.

An alternative code mask 20 is shown in FIG. 3 with its central pattern compressed and with the width of the area increasing as the edge of the code mask is approached. This has a practical advantage over the code mask illustrated in FIG. 2. The vertical resolution or sharpness of the image of the slit 110, represented by light beam 150, tends to diffuse as the deflection caused by mirror 19 increases. The comparatively wide digit divisions at the edges of the code pattern prevent the fuzzy edges of the image from overlapping more than one vertical code pattern. The compressed configuration of the mask also enables the encoder to encode low value signals more accurately by reducing the quantizing noise entailed in quantizing low valued signals.

A code mask such as the ones described may be manufactured by the process of evaporating aluminum on the surface of an optical plate that is covered by a photosensitive emulsion. This photosensitive emulsion is exposed to ultraviolet light by placing the glass plate on which the pattern is to be formed in an optical system similar to the encoder and selectively blocking or transmitting the ultraviolet light by single channel masks as the rotatable mirror is rotated to various precalibrated angular positions. The plate is then washed with hot water to remove the unexposed emulsion. The aluminum is then deposited on the glass plate. The aluminum will adhere to those portions of the disc not illuminated by ultraviolet light. The aluminum on the emulsion which has been exposed is then removed along with the emulsion in a suitable solution. The result is a transmitting and reflective code mask. It is to be understood that this is only one of the many ways in which a suitable code mask could be made to be used in an optical encoder such as the one disclosed in the present application.

One particular embodiment of the invention which is particularly suitable for encoding seismographic information is designed to record eleven code groups a second. The clock 35 is designed to deliver fifty-five pulses a second. The pulse divider 32, which is triggered by the output of the clock 35 produces eleven pulses a second. The shift register 23 is designed to store a four-bit word. The flash lamp 17 is designed to be flashed with each output pulse of the pulse divider 32, or eleven times a second, and for a duration of one microsecond. This example is intended to illustrate one particular embodiment of the invention disclosed and is not intended to limit the invention to the specific embodiment.

It is to be understood that the above-described arrangement is merely illustrative of the numerous and varied arrangements which may constitute application of the present invention. Such other arrangements may readily be devised by those skilled in the art without departing from the spirit and scope of the invention.

What is claimed is:

1. An optical encoding and recording system comprising a movable mirror which is variably positioned in response to an external condition, means to illuminate said movable mirror, a code mask positioned to intercept the light reflected from said movable mirror, said code mask comprised of light transparent material having a coded pattern of reflective material distributed thereon so as to form complementary transparent and reflective areas, said reflective areas forming reflected light patterns corresponding to the binary representations of respective positions of said mirror, said light transparent areas passing light patterns that correspond to the complement of said binary representations of said positions of said mirror, light detection means positioned to intercept the patterns of light passed by said code mask, said light detection means comprising a plurality of photomultiplier tubes, and light recording means positioned to intercept the patterns of light reflected from said code mask.

2. An optical encoding and recording system as defined in claim 1 wherein the illuminating means comprises a pulsed electric lamp and a mirror having a narrow slit therein which passes to said movable mirror only a predetermined limited portion of the light of said lamp, the reflected light patterns traversing a path to said light recording means that includes said movable mirror and the aforementioned slit mirror.

3. An optical encoding and recording system as defined in claim 2, wherein said light recording means comprises photographic film.

References Cited by the Examiner
UNITED STATES PATENTS

| | | | |
|---|---|---|---|
| 2,784,397 | 3/57 | Branson | 340—347 |
| 2,994,863 | 8/61 | Trapnell | 340—347 |

OTHER REFERENCES

IBM Technical Disclosure Bulletin, "Optical Read-Only Memory," by Fleisher and Burton, vol. 4, No. 2, July 1961, page 62.

MALCOLM A. MORRISON, *Primary Examiner.*